June 14, 1966     A. BRADSHAW ETAL     3,255,710

CONVEYORS

Filed March 24, 1964

Fig. 1

Inventors
Arthur Bradshaw
Ernest C. Kenney
Joseph Robbins
Bernard A. Murphy
By their Attorney June 14, 1966  A. BRADSHAW ETAL  3,255,710

CONVEYORS

Filed March 24, 1964  9 Sheets-Sheet 5

United States Patent Office 3,255,710
Patented June 14, 1966

3,255,710
CONVEYORS
Arthur Bradshaw, Ernest C. Kenney, Joseph Robbins, and Bernard A. Murphy, all of Leicester, England, assignors to United Shoe Machinery Corporation, Flemington, N.J., a corporation of New Jersey
Filed Mar. 24, 1964, Ser. No. 354,247
Claims priority, application Great Britain, Apr. 6, 1963, 13,793/63
5 Claims. (Cl. 104—162)

The present invention relates generally to improvements in conveyor assemblies and more particularly to endless conveyors on which a plurality of trolleys is supported to be advanced intermittently from one work station to another to carry parts such as shoes or shoe subassemblies to be operated upon at the stations.

In the manufacture of many articles, including shoes, it is advantageous to carry parts to a succession of work stations at each of which an individual operation is carried out. Because of the differences in the duration of operations it is desirable that the trolleys carrying articles to the work stations be arranged to continue to advance, after stoppage, at the discretion of the operator performing an individual operation.

It is accordingly an object of the invention to provide article conveying apparatus permitting a discretionary and individual control for the performance of operations at each work station.

A related object is to provide increased flexibility in the operation of conveyor apparatus.

Another object is to permit variations in the speed at which articles are carried by conveyor apparatus.

Still another object is to achieve flexibility in conveyors without increasing their cost or complexity.

The foregoing objects are achieved in a conveyor including a pair of endless rails for removably supporting a plurality of article carrying trolleys. Adjacent the rails is a series of conveyor members arranged parallel to the rails and driven with a back and forth motion, either reciprocating along a straight portion of track or oscillating around a bend. The conveyor carries at regular intervals a series of dogs which according to the invention engage brushes mounted on the trolleys. The brushes are so positioned and provided with auxiliary devices that they receive an advancing movement from each dog while the dogs are moving in a trolley advancing direction. The bristles of the brushes are merely flicked aside by the dog traveling in a return direction and impart no motion to the trolley.

In addition, other features relating to the invention are stops at work stations for arresting the progress of the trolleys and mechanism on the leading end of each trolley including a bumper and connections between the brush and the bumper for preventing the further advance of the trolley when its bumper comes into contact with a stationary trolley at a work station.

Still another feature of the invention relates to an associated mechanism for causing trolleys to advance at a lower speed along a preselected portion of the conveyor. The associated mechanism comprises a ratchet bar adjacent the conveyor and connections between the conveyor and the ratchet bar for imparting a shorter stroke to the ratchet than that at which the conveyor is being driven. There is also included a device for preventing the brush from being driven by the dogs while members engage the ratchet for driving the trolley a shorter distance during each trolley advancing movement of the conveyor.

The foregoing objects of the invention and several features and advantages will be more fully appreciated from the following detailed description of an illustrative embodiment taken in connection with the accompanying drawings in which:

Figure 1:
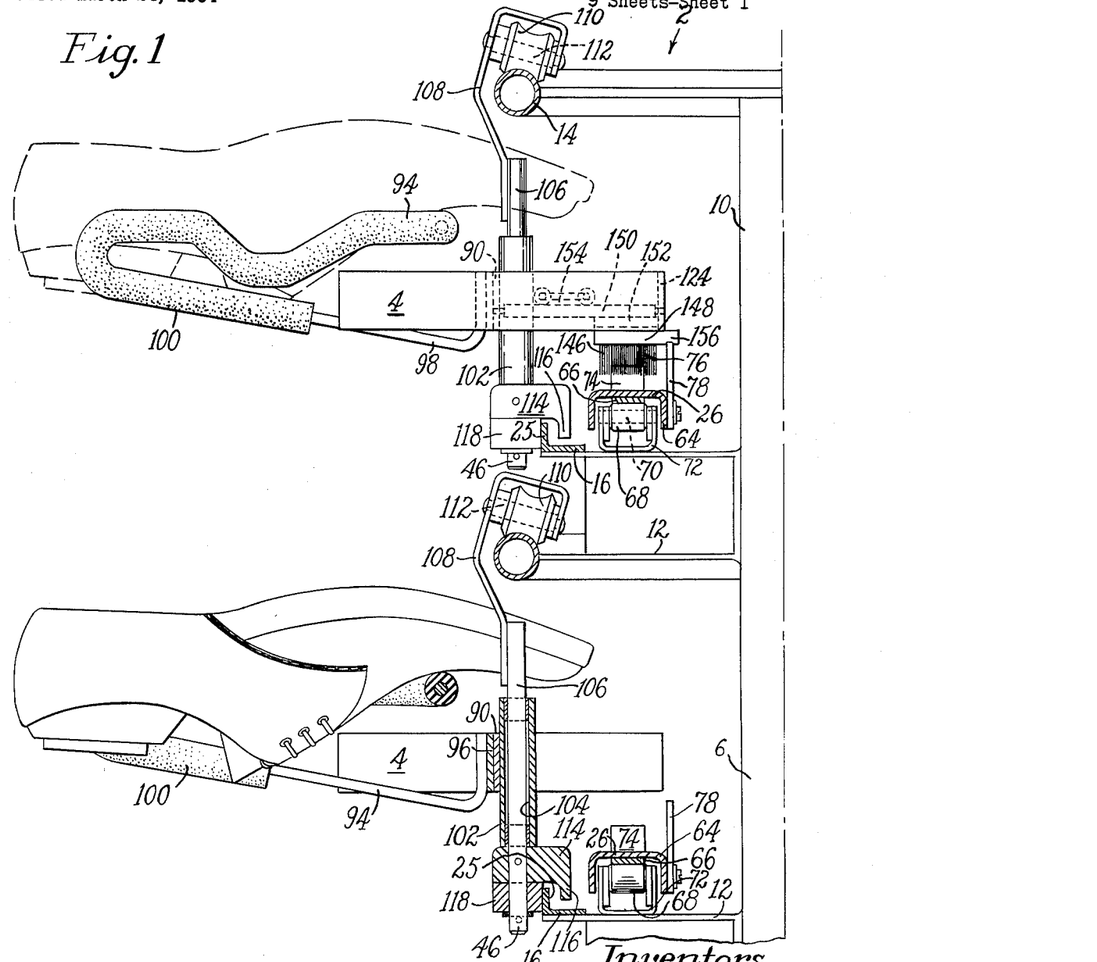
FIG. 1 is a view in side elevation partly in section showing the left side of a conveyor and trolleys according to the present invention.
Figure 1A:
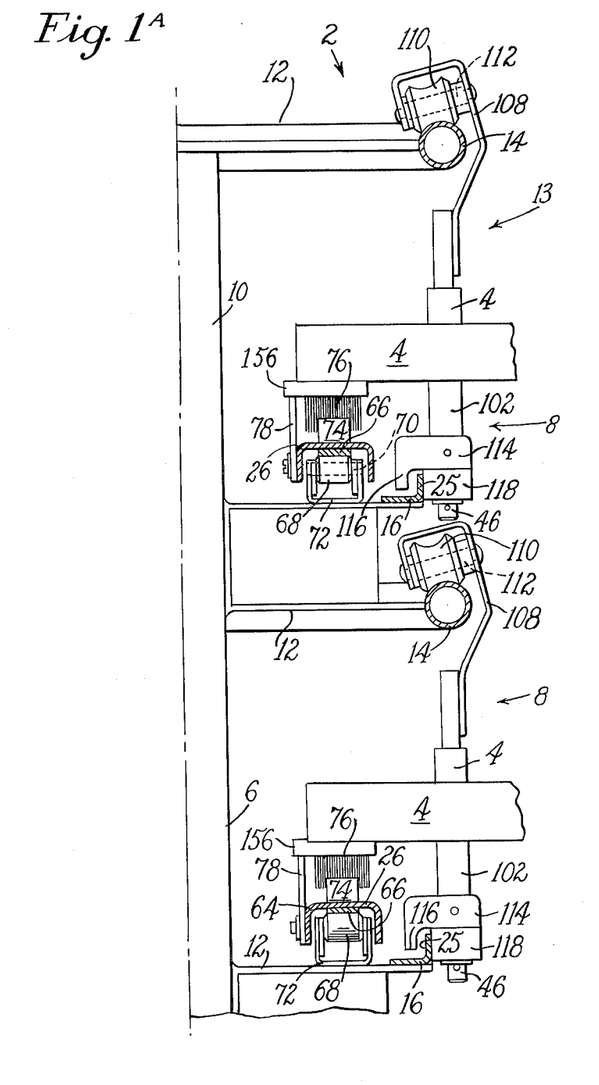
FIG. 1A is a view of the right side of the conveyor of FIG. 1.

The illustrative conveyor assembly is adapted for use in the manufacture of shoes and comprises a conveyor 2, FIG. 1, and a plurality of trolleys 4 which are adapted to be moved progressively on the conveyor 2, carrying shoes between a plurality of stations at which various shoe making operations are carried out; the trolleys 4 may readily be removed from the conveyor 2 when required.

The conveyor 2 comprises (FIG. 1) a framework 6 (only part of which is shown) which rests on the floor and supports four endless horizontal tracks generally indicated at 8 (only two of which are shown) one directly above another and each at a height above the floor convenient to an operator. The trolleys 4 are supported on the tracks 8 when the assembly is in use. Each track 8 comprises an upper horizontal endless rail 14 of circular cross section and a lower horizontal endless rail 16 of L-shaped cross section. The track 8 has uniformly spaced portions 13, 15 (FIGS. 1, 4, 6 and 7), the portion 13 having straight parts and two gentle convex bends 18, 19 while the portion 15 also has straight parts and two gentle concave bends 20, 21. The portions 13 and 15 are joined at their ends by sharp convex U-shaped bends 22, 24, FIG. 7.

The framework 6 comprises (FIG. 1) vertical central support members 10 (only one of which is shown) which rest on the floor and support horizontal brackets 12 extending from each member 10 on either side and the rails 14, 16 are in turn supported on end portions of the brackets. The rail 16 of each track 8 includes a vertically extending portion 25 so that a trolley 4 supported on the track 8 hangs from the rail 14 and is steadied when in movement by the portion 25 of the rail 16.

Figure 4:
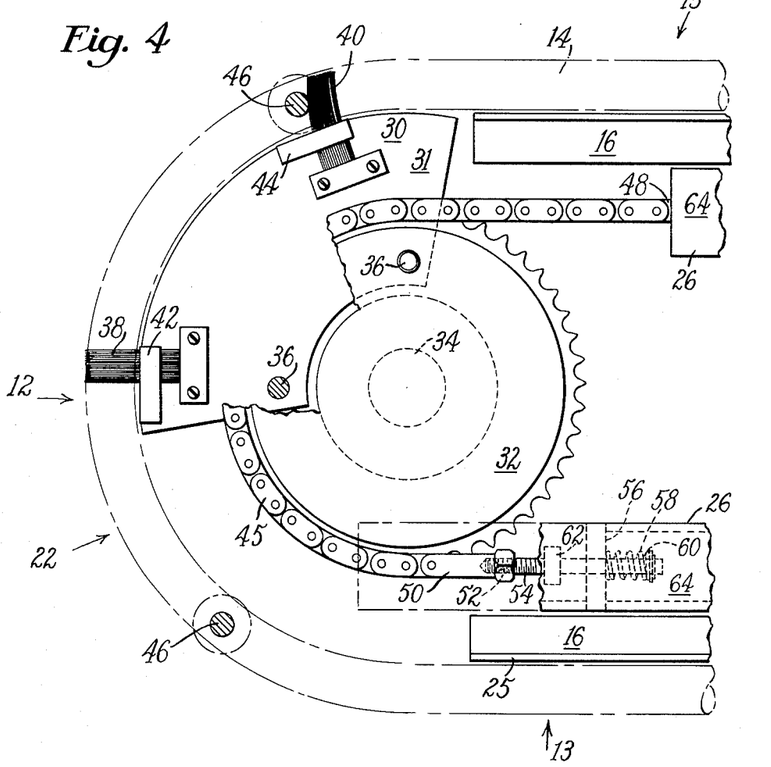
FIG. 4 is a plan view of the conveyor track and trolley conveying means disposed at a sharp convex bend.
Figure 6:
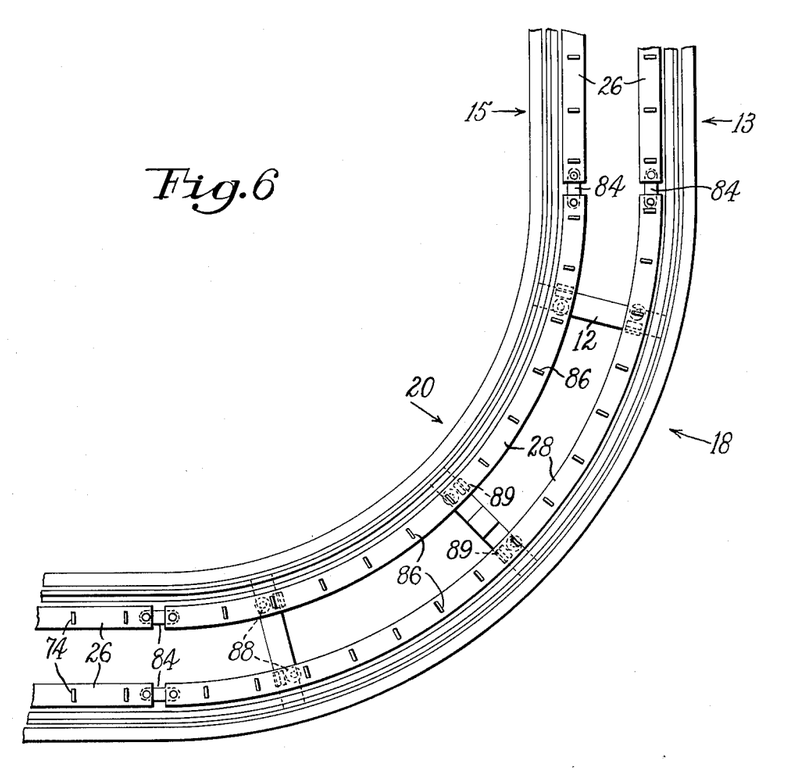
FIG. 6 is a schematic plan view of the trolley conveying members at a curve in the track.
Figure 7:
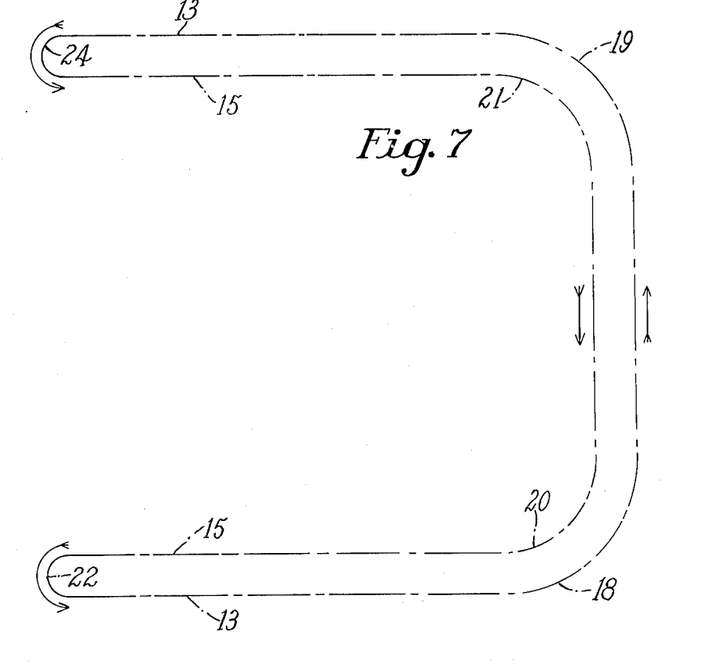
FIG. 7 is a schematic plan view showing a typical track layout.

The conveyor 2 comprises conveying means associated with each track 8 arranged to move the trolleys 4 forwardly along the track in the direction indicated by arrows in FIG. 7. The conveying means of each track 8 comprises six straight conveyor members 26 some of which are shown in FIGS. 4 and 6. Each of the conveyor members 26 extends along a straight part of the track 8. Four curved conveyor members 28 two of which are shown in FIG. 6 are mounted, one at each of the bends 18, 19, 30 and 21 and two curved conveyor members 30 one of which is shown in FIG. 4 are mounted, one at each of the bends 22, 24. Each member 28, 30 is connected to adjacent members 26 and when the conveyor is in use the members 26, 28, 30 move continuously back and forth together along the track 8 with a short stroke to advance the trolleys 4 along the track by means hereinafter to be described.

The conveying means also comprises (FIG. 4) a horizontal sprocket 32 mounted on a vertical shaft 34 journalled in the framework 6 for oscillation generally concentric with the bend 22. The conveyor member 30 of the bend 22 comprises a horizontal plate 31 which is generally sectoral in shape and is secured by pins 36 to the underside of and concentric with the sprocket 32. The conveyor member 30 also comprises two nylon bristled brushes 38 and 40 which are secured by screws to the plate 31 and extend outwardly and generally radially beyond the plate 31. The brushes 38 and 40 pass through brackets 42 and 44 respectively which are secured to the plate 31. The bracket 42 extends generally at right angles to the brush 38 and provides a longitudinal slot in which the bristles of the brush 38 are free to yield in a counterclockwise direction (FIG. 4) relative to the plate 31, and the slot in the bracket 42 has an end face close to the brush 38 which acts to restrain the bristles from yielding more than a little in a clockwise direction relative to the plate 31. Similarly the bristles of the brush 40 are free to yield in the bracket 44 in a counterclockwise direction and are restrained by the bracket 44 from yielding more than a little in a clockwise direction. The construction, arrangement and mode of operation of the conveying member 30 of the bend 24 corresponds generally to that of the member 30 of the bend 22 except that at the bend 22 the shaft 34 is moved clockwise and counterclockwise about its axis by an electric motor and crank mechanism (not shown) while at the bend 24 a shaft corresponding to the shaft 34 is mounted freely for back and forth oscillation.

Each trolley 4 comprises two downwardly extending lugs 46 which are engageable with the brushes 38, 40 to advance the trolley round the bend 22. In advancing the trolley 4 round the bed 22 counterclockwise movement of the conveyor member 30 at times may cause one of the brushes 40, 42 to engage one of the lugs 46 (FIG. 4). However, during return, clockwise movement of the member 30, as one of the brushes 40, 42 engages one of the lugs 46 the bristles yield and flick past the lug without causing any substantial movement of the trolley 4.

A chain 45 passes round the sprocket 32 and one end link 48 of the chain 45 is resiliently connected to one of the conveyor members 26 which extend along the portion 15 of the track 8. The other end link 50 of the chain 45 is resiliently connected to another of the conveyor members 26 which extends along the portion 13 of the track. Thus, as the conveyor member 30 oscillates about the axis of the shaft 34 the two members 26 also move back and forth along the track 8 with a short stroke.

The end link 50 of the chain 45 comprises a threaded horizontal end bore 52 into which a horizontal pin 54 is screwed. The pin 54 is mounted for longitudinal sliding movement in a transverse bar 56 mounted in the member 26 for connecting the link 50 to the member 26. A compression spring 58 acts between the bar 56 and a collar 60 which is secured to an end portion of the pin 54. A knurled collar 62 is secured to the pin 54 and rotation of the collar 62 adjusts the tension in the chain 45. The end link 48 of the chain 45 is connected in the same manner to the other member 26.

Each member 26 comprises a horizontal longitudinal bar 64 of inverted U cross section (FIG. 1). A bearing bar 66 is secured to the underside of the bar 64 and rests on a plurality of rollers 68 along which the member 26 rolls in its reciprocating movement. Each roller 68 is mounted for rotation on a horizontal axle 70 which extends transversely of the member 26 and is mounted in a U-shaped bracket 72 secured to the upper surface of one of the brackets 12.

Figure 2:
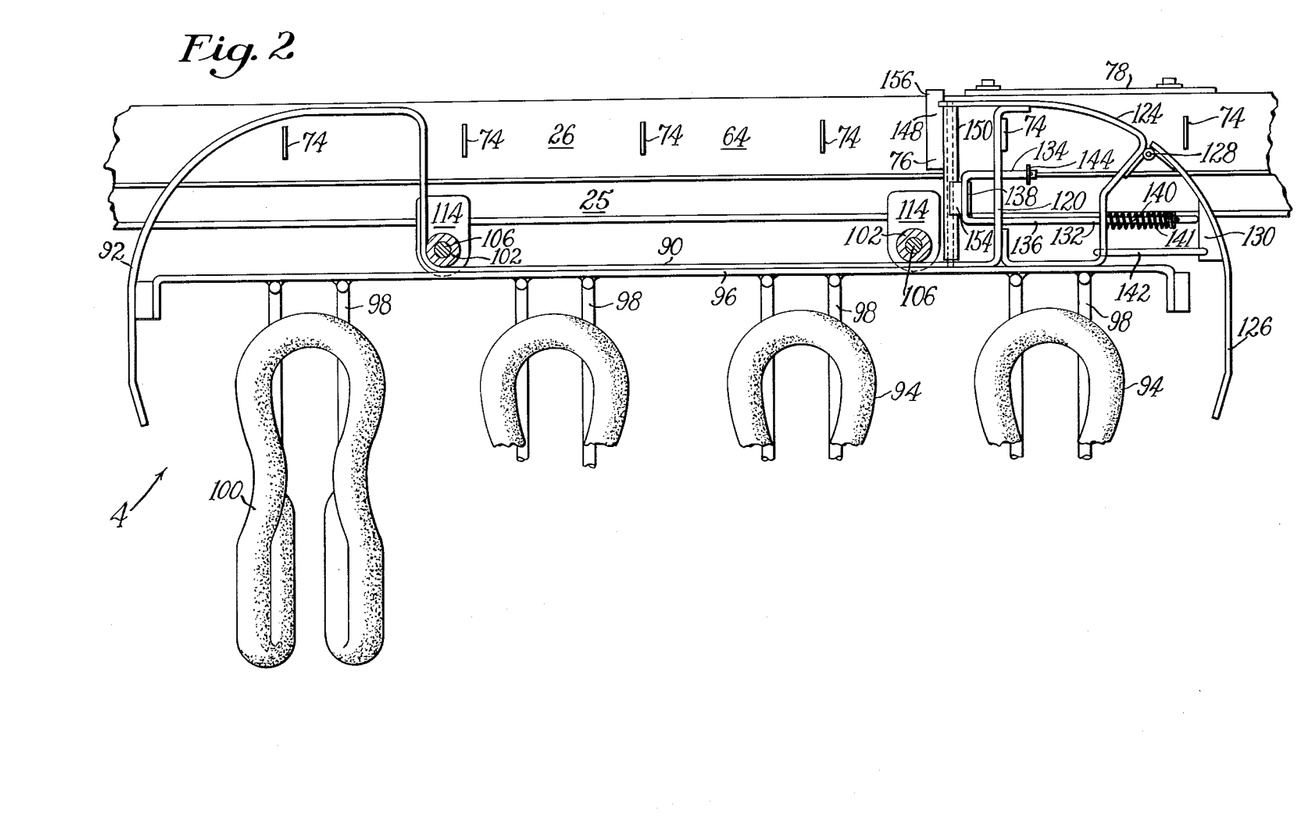
FIG. 2 is a plan view of a trolley depicted in FIG. 1.
Figure 3:
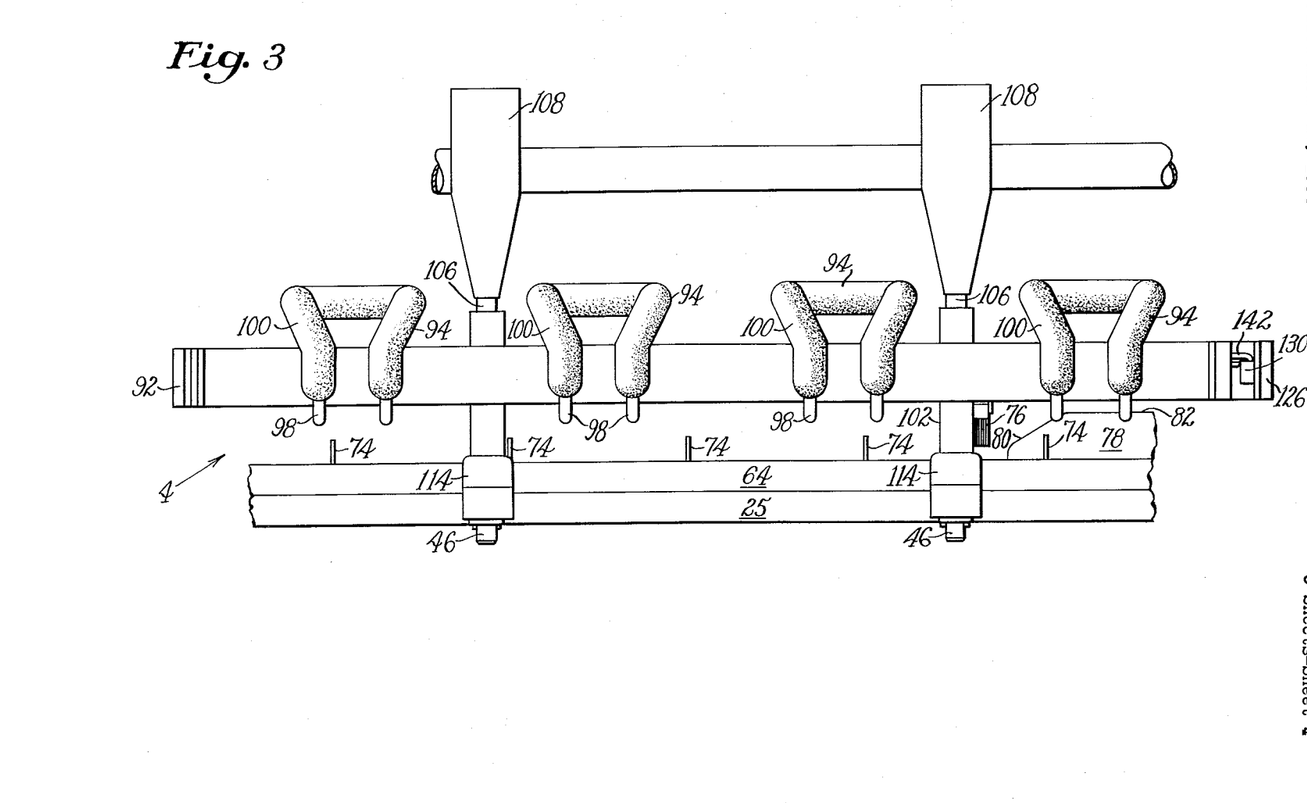
FIG. 3 is a plan view in side elevation of the trolley of FIG. 2.

Each conveyor member 26 also comprises a plurality of transverse vertical dogs 74 which are spaced apart along the bar 64 as seen in FIGS. 2 and 3, extending vertically from its upper surface. Each trolley 4 comprises a device comprising a brush 76 (FIGS. 1 and 5) which is engageable by the dogs 74 of the conveyor member 26. As will be seen, the brush 76 is mounted to yield rearwardly when engaged by a dog 74 of the member 26 in the rearward movement of the member 26 so that the trolley 4 is not moved substantially by said engagement, and to be held against yielding forwardly when engaged by a dog 74 in the forward movement of the member 26 so that the trolley 4 is advanced by said engagement.

Figure 5:
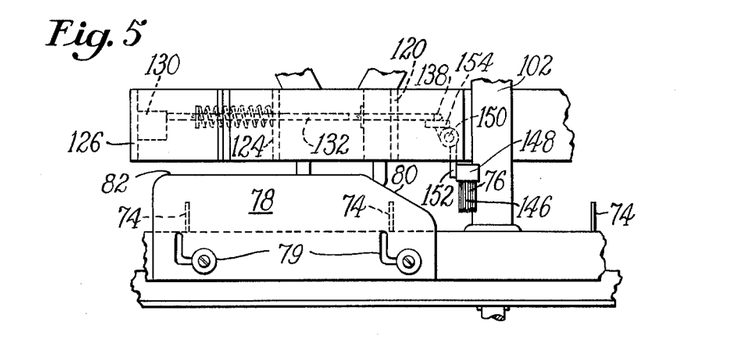
FIG. 5 is a fragmentary view in side elevation of parts of the trolley and track as seen from the side opposite that of FIG. 3.

Each of the stations at which the operations are carried out lies alongside straight parts of the four tracks 8 and each of the four conveyor members 26 has at each station a stop member 78 secured to the member 26 by screws 79 through L-shaped slots providing horizontal and vertical adjustment. Each stop member 78 includes an inclined plane 80 leading to a horizontal plane 82 as seen in FIG. 5. The member 78 is arranged to arrest a trolley 4 reaching the station by engaging the brush 76 of the trolley to move it to a position in which it is not engaged by the conveyor member 26. The shoes are removed from the trolley 4 arrested at the station, operated upon, and replaced on the trolley 4 which is then pushed manually past the member 78 until it is again moved forwardly by the member 26.

Each curved conveyor member 28 is connected to adjacent members 26 by links 84 (FIG. 6) which are pivoted to end portions of the members 26, 28. The members 28 correspond generally in many respects to the members 26, being of inverted U cross section and having dogs 86 corresponding in construction, arrangement and mode of operation to the dogs 74. The members 28 rest on rollers 89 corresponding to the rollers 68 and mounted on brackets 12. Also mounted on the brackets 12 on which the rollers 89 are mounted are rollers 88 mounted for rotation about vertical axes engaging the side surfaces of the members 28 so as to restrain the members against lateral movement.

Each trolley 4 comprises a frame member 90 seen in FIG. 1, formed to provide a rear bumper 92 (FIG. 2) of the trolley 4. The trolley 4 also comprises four shoe holders 94 which are mounted on a support member 96 secured to the frame member 90. When the trolley 4 is supported on the track 8 the shoe holders are located laterally of the rail 25 of the track 8 remote from the conveying means (FIG. 1). Each shoe holder 94 (FIGS. 2 and 3) is shaped to support a shoe with its sole uppermost and comprises a wire frame 98 which extends from the member 96 and is covered with polyurethane foam 100 on which a shoe is supported. The trolley 4 is arranged to be movable readily round the bends 18, 19, 20, 21, 22, 24 and comprises two vertical pillars 102 secured to and spaced apart along the member 90. Each pillar 102 comprises a bore 104 (FIG. 1) in which a spindle 106 is mounted for swivelling movement about a vertical axis. A hook-shaped (FIG. 1) bracket 108 is secured to an upper end portion of the spindle 106 and rotatably supports a roller 110 on an axle 112. The axles 112 of the trolley 4 slope downwardly slightly towards the conveying means and the trolley 4 hangs from the rail 14 with the rollers 110 fitted to and supported on the rail 14. When the trolley 4 is moved along one of the bends, the rollers 110 swivel on the spindles 106.

A bracket 114 is secured to the lower end of each pillar 102 and the spindle 106 passes freely through the bracket 114. Each bracket 114 comprises a downwardly extending limb 116 which hangs over the vertically extending portion 25 of the rail 16. A roller 118 is freely mounted for rotation on each spindle 106 and is arranged to roll along the outer side of the portion 25 so that the limb 116 and roller 118 act to steady the trolley 4 when it is being moved along the track 8. A lower end portion of each spindle 106 which extends below the roller 118 provides the lug 46.

The frame member 90 of the trolley 4 comprises, as seen in FIG. 2, a portion 120 which extends at right angles to the support member 96. Secured to the portion 120 is a frame member 124 of irregular shape and a curved bumper 126 of the trolley 4 is mounted for povital movement about a vertical axis on the frame member 124 by a hinge 128. A rearwardly facing surface of the bumper 126 carries a block 130 which is engaged by a catch 132 mounted for sliding movement in the frame member 124 and in the portion 120 of the frame member 90. The catch 132 is U-shaped comprising two limbs 134, 136 joined by a cross piece 138. A spring 140 surrounds the limb 136 and acts between the frame member 124 and a collar 141 to urge the catch member 132 and thus the bumper 126 forwardly or to the right as seen in FIG. 2. Forward movement of the bumper 126 is restricted by a link 142 which is mounted on the block 130 and is slidable in the frame member 124. A collar 144 secured to the limb 134 is arranged to restrict rearward movement of the catch member 132 by engagement with the portion 120 of the frame member 90.

The brush 76 of the trolley 4 comprises nylon bristles 146 mounted in a metal support 148 as seen in FIGS. 1 and 5. The trolley 4 comprises a horizontal axle 150 mounted in and extending between the frame members 90, 124 and also parallel to and generally coextensive with the portion 120 of the frame member 90. A plate 152 is secured to the axle 140 and extends downwardly therefrom, and the support 142 is secured to the plate 152. Another plate 154 is secured to and extends forwardly from the axle 150. When the catch 132 is in the position of FIGS. 2 and 5 into which it is urged by the springs 140, the crosspiece 138 of the catch 132 is in engagement with an upper surface of the plate 154 and restrains the brush 76 from yielding forwardly about the axle 150 when engaged by a dog 74 moving forwardly. This causes the trolley 4 to be advanced by the engagement of the dog with the brush. It will be noted that the brush 76 is free to yield rearwardly about the axle 150 and when engaged by a dog 74, moving rearwardly, yields rearwardly about the axle 150 it permits the dog 74 to flick past the brush 76 without moving the trolley 4 substantially. When in advancing, the bumper 126 of a trolley 4 engages the rear bumper 92 of another stationary trolley, the advancing trolley 4 comes to rest and the bumper 126 of the advancing trolley is moved rearwardly about the hinge 128. The crosspiece 138 is thus moved to the rear of the plate 154 and the brush 76 is free to yield forwardly about the axle 150 so that when engaged by a dog 74 moving forwardly, the plate 154 permits the dog 74 to flick past the brush 76 without moving the trolley substantially. The plate under these conditions passes between the limbs 134, 136 of the catch 132.

When the trolley 4 is moved to one of the stop members 78 a sideways extending portion 156 of the support 148 rides up the inclined plane 80 of the stop to the plane 82. The brush 76 is moved rearwardly about the axle 150 to a position in which it is not engaged by the conveyor member 26 and the trolley 4 comes to rest, the plane 82 moving in engagement with the portion 156 as the member 26 moves back and forth.

When it is required to remove the trolley 4 from the track 8, the trolley is lifted upwardly until the limb 116 is above the portion 25 of the rail 16 and then the trolley is moved laterally from the track 8.

Figure 8:
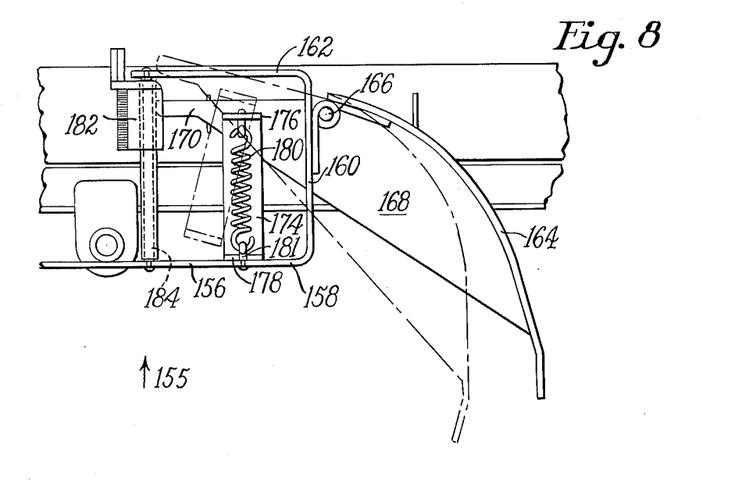
FIG. 8 is a fragmentary plan view showing devices associated with a bumper for arresting the forward motion of an advancing trolley upon its abutting a stationary one.

An alternative construction or variation has been found advantageous to replace the bumper 126 and its associated connections for performing the function of arresting forward progress of an advancing trolley when it abuts a stationary one at a work station. The variations include a trolley 155 adapted to be supported on the tracks 14 and 16 and to be moved along the conveyor 2 in generally the same manner as the trolley 4. Since the trolley 155 corresponds in most respects to the trolley 4 it will be described only for the purposes of pointing out the differences. Each trolley 155 comprises a frame member 156, corresponding generally to the frame member 90. A front end portion of the frame member 156 is U-shaped, comprising a limb 158, a crosspiece 160 and another leg 162. A front bumper 164, corresponding generally to the bumper 126 is pivotally mounted on the crosspiece 160 by a hinge 166. A catch comprising a horizontal plate 168 is secured to and extend rearwardly (or to the left as seen in FIG. 8) from the bumper 164. Secured to an upper surface of the plate 168 is a transversely extending bracket 174 which comprises upstanding end portions 176, 178. A spring 180 is stretched between the end portion 176 and a hook 181 secured to the limb 158 and acts to urge the bumper 164 forwardly by means of the plate 168, i.e. counterclockwise about the hinge 166.

Forward movement of the bumper 164 is restricted by engagement between the end portion 178 and the limb 158. Rearward movement of the bumper is restricted by a stop (not shown) secured to a shoe holder support (not shown). In the position into which it is urged by the spring 180, the plate 168 holds a brush 182 of the trolley, corresponding to the brush 76, against yielding forwardly. When the bumper 164 of an advancing trolley engages the rear bumper of a stationary trolley the bumper of the advancing trolley is moved rearwardly, i.e. clockwise, about the hinge 166 moving the plate 168 from the position shown in full line in FIG. 8 to a position (shown in broken line in FIG. 8) in which the brush 182 of the advancing trolley is free to yield forwardly. The brush 182 is mounted for pivotal movement on a horizontal transversely extending axle 184 which is mounted in and extends between the limbs 158, 162. A rearward portion of the plate 168 comprises an arm 170 which in the full line position engages a forwardly facing surface of the brush 182 and restrains the brush from yielding forwardly about the axle 184. When the bumper 164 is moved rearwardly about the hinge 166 the arm 170 is moved to a position away from the brush 182 and the brush 182 is free to yield forwardly about the axle 184.

Figure 9:
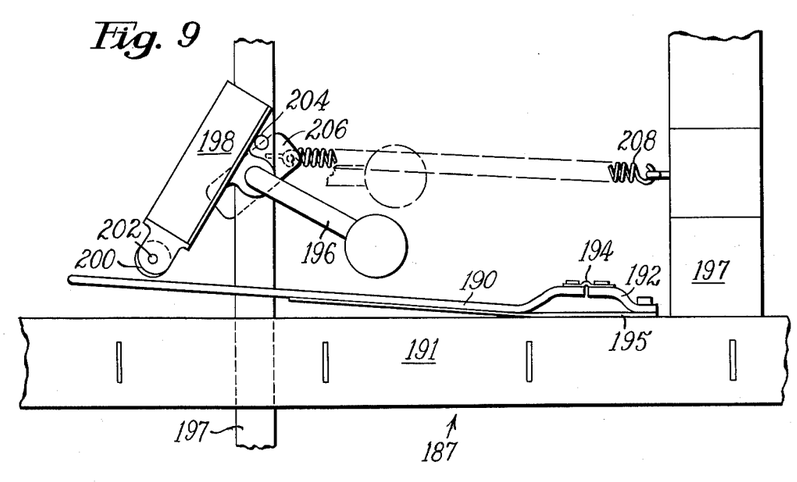
FIGS. 9 and 10 are views in plan and side elevation respectively showing a device for arresting a trolley at a work station.
Figure 10:
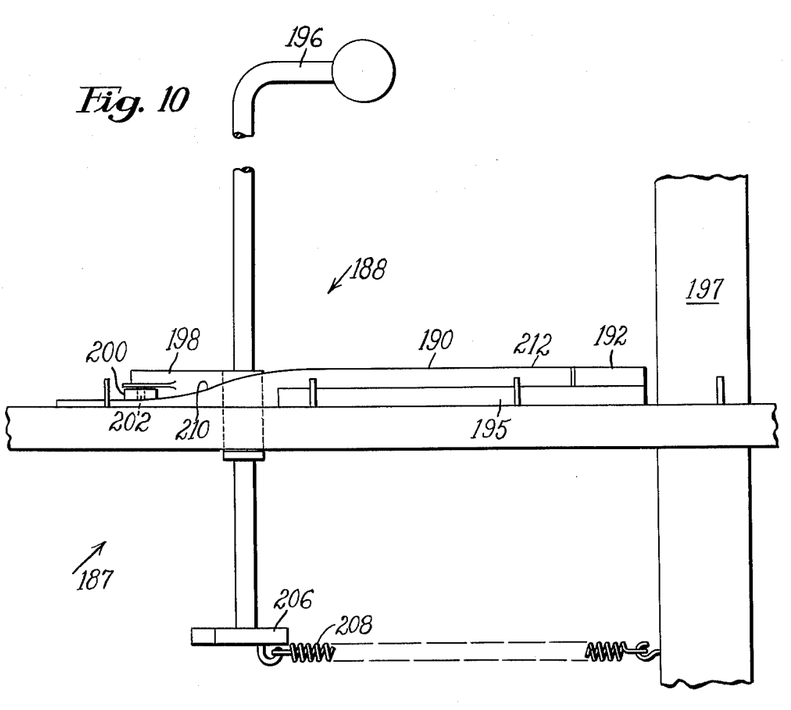
Figure 11:
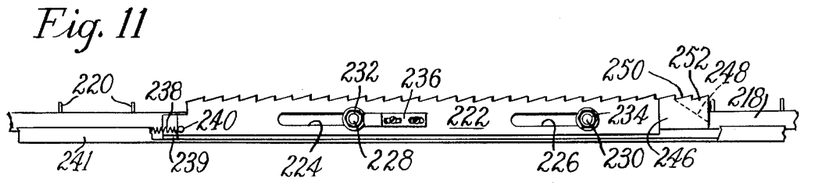
FIGS. 11 and 12 are views in side elevation and plan respectively showing a ratchet device adjacent the conveyor for advancing trolleys at a slower speed over a part of the path of the conveyor.
Figure 12:
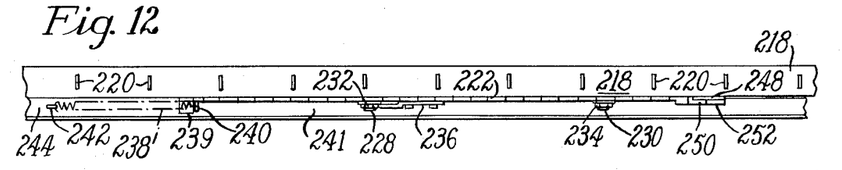

A conveyor 187 along which the trolleys are adapted to be moved is shown in FIGS. 9 and 10. The conveyor 187 is a variation of and corresponds in many respects to the conveyor 2 and is therefore described only insofar as it differs therefrom. The conveyor 187 comprises, in place of certain of the stop members 78 of the conveyor 2, stop devices indicated generally at 188. Each stop device 188 comprises a stop member 190 which is connected to a bracket 192 by a vertical hinge 194. The bracket 192 is secured to a conveyor member 191 corresponding to a conveyor member 26. A leaf spring 195 acts between the conveyor member 191 and the stop member 190 to urge it into a first or upper position (FIG. 9) in which it is out of the path of the brush of a trolley 4 reaching the stop device 188. Under these conditions the trolley is not arrested. The device 188 comprises a handle 196 which is mounted in a framework 197 of the conveyor 187 for movement about a vertical axis. Secured to the handle 196 is a bracket 198 extending from the handle 196 towards the stop member 190. A roller 200 is mounted on a vertical pin 202 in the distal end portion of the bracket 198 adjacent the member 190. A vertical stop 204 is mounted on the framework 197 and the bracket 198 abuts the stop 204 when it is in a position in which the stop member 190 is in its upper position. A plate 206 is secured to the lower end portion of the handle 196 and a spring 208 is stretched between a hook secured to the plate and a hook secured to the framework 197. When the stop member 190 is in its upper position (FIG. 9) the spring 208 urges the bracket 198 against the stop 204, but movement of the handle counterclockwise from the position shown in full line in FIG. 9 to the position shown in broken line causes the roller 200 to engage the stop member 190 and move it towards the member 191 into a second or lower position (not shown) in which it extends into the path of a trolley reaching the stop device 188. The trolley comes to rest as a result of a laterally extending portion of the brush riding up an inclined plane 210 (FIG. 10) and onto a horizontal plane 212 of the member 190. When the member 190 is in its second position the spring 208 urges the roller 200 against the member 190 in a counterclockwise direction. As the member 191 moves back and forth the roller 200 rolls in engagement with the member 190.

As shown in FIGS. 11 to 14, there is an assembly which includes a conveyor comprising conveying means arranged to move trolleys 214 at one speed along a major part of a track 216 and at a lower speed at certain localities along the track 216 where it is required to move the trolleys slowly through a work area.

The conveying means comprises conveyor members 218 corresponding generally to the conveyor members 26. Each conveyor member 218 comprises dogs 220 corresponding to the dogs 74. A ratchet conveyor member 222 is mounted on the side of the member 218. When the assembly is in use the conveyor member 218 moves back and forth with a short stroke to advance trolleys 214 (FIG. 13) along the track 216 at a certain average speed while the ratchet member 222 also moves back and forth with the member 218 but with a shorter stroke whereby it advances trolleys 214 at a slower average speed. The ratchet member 222 comprises two alined longitudinal slots 224 and 226. Pins 228 and 230 project from the members 218 through the slots 224, 226 respectively. Nuts 228, 230 respectively hold the members 222 slidably on the pins 228, 230. A longitudinally adjustable plate 236 provides a forward end portion of the slot 224 and a spring 238 acts between a pin 240 secured to the ratchet member 222, and a hook 242 secured to a rail 244, corresponding to the rail 25. The spring 238 urges the member 222 towards a stop 239 secured to a rail 241 corresponding to the rail 16. In the beginning of a rearward movement of the member 218 the ratchet member 222, being urged rearwardly by the spring 238 so that the plate 236 engages the nut 232, moves rearwardly with the member 218 until the member 222 engages the stop 239 and remains stationary while the member 218 continues to move rearwardly. The pins 228 and 230 after the member 222 is stopped, move in the slots 224, 226. In the beginning of a forward movement of the member 218, the pins 228 and 230 move in the slots 224, 226, the members 222 remaining stationary until the nut 232 engages the plate 236 and thereafter causes the member 222 to advance with the member 218. A front end portion 246 of the member 222 is widened and provides a downwardly and forwardly sloping surface 248 between the member 218 and two foremost teeth 250, 252 of the member 222.

Figures 13, 14:
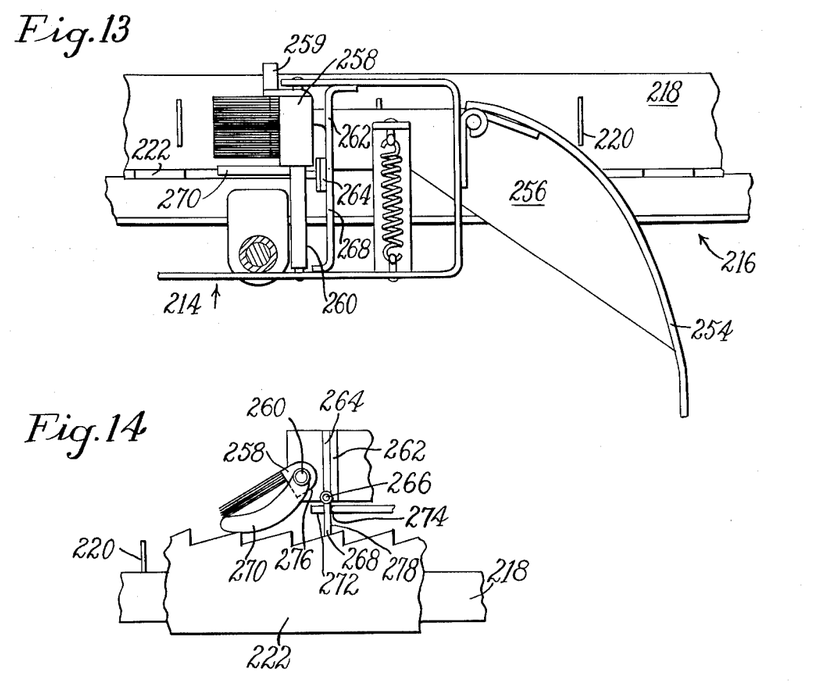
FIGS. 13 and 14 are fragmentary views in plan and side elevation respectively showing the relationship of a brush through which the trolley is driven by the conveyor and means through which the trolley is driven at a slower rate by the ratchet of FIGS. 11 and 12.

Each trolley 214 seen in FIG. 13, comprises a bumper 254, corresponding to the bumper 164, a plate 256 corresponding to the plate 168, a brush 258, corresponding to the brush 182 having a portion 259 corresponding to the portion 186 and an axle 260 corresponding to the axle 184. The trolley 214 also comprises a transverse frame member 262 to which is secured a vertical plate 264. There is hinged to the plate 264 by a transverse horizontal hinge 266 a device comprising a downwardly extending plate 268 which is arranged to be engaged by the ratchet member 222 in its forward movement to advance the trolley 214 forwardly and to yield to rearward movement of the ratchet member 222 so that the trolley 214 is not moved substantially by said engagement. Secured to the axle 260 is a downwardly extending curved cam member 270 which is arranged to ride along the ratchet member 222 to hold the brush 258 out of engagement with the member 218 when the trolley 214 is being advanced by the ratchet member 222. A rearward end portion of the plate 268 comprises an end face 272, seen in FIG. 14, arranged to engage a face 276 of the brush 258 and thus to restrain the brush against yielding forwardly when engaged by a dog 220 in the forward movement of the member 218. Another end face 274 is arranged to restrain the plate 268 against yielding forwardly about the hinge 266 when engaged by the ratchet member 222 which in its forward movement engages a face 278 of the plate 268. Rearward movement of the bumper 254 on engagement with another trolley 214 causes the end faces 272, 274 to move away from the brush 258 and the plate 268 to allow one or the other to yield forwardly according to whether the first mentioned trolley 214 is being moved by the member 218 or the ratchet 222. When the trolley 214, being advanced by the member 218, reaches the ratchet member 222 the cam member 270 rides up onto the ratchet member 222 and moves the brush 258 in a clockwise direction (FIG. 14) out of the way of the dogs 220. The trolley 214 is then moved forwardly by engagement between the ratchet member 222 and the plate 268. When the trolley 214 reaches the forward end portion 246 of the member 222 the cam member 270 rides down the surface 248, the trolley 214 at this time being moved forwardly by the teeth 250, 252 and then the trolley 214 is again advanced by engagement between the member 218 and the brush 258.

From the foregoing description of an illustrative embodiment, many variations and modifications will become apparent to those skilled in the art. It is accordingly not intended that the illustration be taken as a limitation of the invention but rather than the invention be defined in accordance with the appended claims.

Having thus described our invention what we claim as new and desire to secure by Letters Patent of the United States is:

1. A conveyor comprising means defining an endless track, a plurality of trolleys supported on the track and adapted to carry articles to a succession of work stations, conveyor means including interconnected conveyor members mounted adjacent the track and movable in a back and forth motion, dogs mounted at regular intervals on the conveyor members, coupling means on each trolley engageable by the dogs to advance the trolley while the members are moving in one direction and to permit passage of the dogs without moving the trolley while the members are moving in the opposite direction, and low speed trolley advancing means adjacent a part of the track for advancing the trolleys about that part of the track at an average speed slower than that of the advancing motion of the conveyor members.

2. A conveyor comprising means defining an endless track, a plurality of trolleys supported on the track and adapted to carry articles to a succession of work stations, conveyor means including interconnected conveyor members mounted adjacent the track and movable in a back and forth motion, dogs mounted at regular intervals on the conveyor members, coupling means on each trolley engageable by the dogs to advance the trolley while the members are moving in one direction and to permit passage of the dogs without moving the trolley while the members are moving in the opposite direction, and low speed trolley advancing means including a ratchet member and driving means between the conveyor means and the ratchet member for imparting a shorter stroke to the ratchet member than that through which the conveyor means travels.

3. A conveyor comprising means defining an endless track, a plurality of trolleys supported on the track and adapted to carry articles to a succession of work stations, conveyor means including interconnected conveyor members mounted adjacent the track and movable in a back and forth motion, dogs mounted at regular intervals on the conveyor members, coupling means on each trolley engageable by the dogs to advance the trolley while the members are moving in one direction and to permit passage of the dogs without moving the trolley while the members are moving in the opposite direction, and low speed trolley advancing means including a ratchet member and driving means including an adjustable driving connection between the ratchet member and the conveyor means for imparting an adjustable shorter stroke to the ratchet than that through which the conveyor members travel thereby imparting an adjustable lower speed of travel to trolleys about a part of the track.

4. A conveyor comprising means defining an endless track, a plurality of trolleys supported on the track and adapted to carry articles to a succession of work stations, conveyor means including interconnected conveyor members mounted adjacent the track and movable in a back and forth motion, dogs mounted at regular intervals on the conveyor members, a brush mounted on each trolley and oriented with the bristles extending toward the dogs and rearwardly with respect to the direction of travel of the trolley thereby presenting the bristles of the brush to driving engagement by the dogs for advancing the trolley while the conveyor members are moving in one direction and for permitting the dogs to flick the bristles out of their path without imparting motion to the trolley while the conveyor members are moving in the opposite direction.

5. A conveyor comprising means defining an endless track, a plurality of trolleys supported on the track and adapted to carry articles to a succession of work stations, conveyor means including interconnected conveyor members mounted adjacent the track and movable in a back and forth motion, dogs mounted at regular intervals on the conveyor members, coupling means on each trolley including a brush mounted on each trolley and oriented with the bristles extending toward the dogs and rearwardly with respect to the direction of travel of the trolley thereby presenting the bristles of the brush to driving engagement by the dogs for advancing the trolley while the conveyor members are moving in one direction and for permitting the dogs to flick the bristles out of their path without imparting motion to the trolley while the conveyor members are moving in the opposite direction, a stationary cam at a work station and a lateral extension on the brush engageable by the cam for displacing the brush out of the path of the dogs thereby arresting the trolleys at the work station.

References Cited by the Examiner

UNITED STATES PATENTS

| | | | |
|---|---|---|---|
| 761,484 | 5/1904 | Hetzel | 104—172 |
| 1,408,047 | 2/1922 | Upp. | |
| 2,572,011 | 10/1951 | Cohen et al. | |
| 2,619,916 | 12/1952 | Rainier | 104—172 |
| 2,885,969 | 5/1959 | Kay et al. | 104—172 |
| 2,987,012 | 6/1961 | King | 104—172 |
| 3,013,506 | 12/1961 | Chill et al. | 104—162 |
| 3,067,696 | 12/1962 | Jackson et al. | 104—162 |

ARTHUR L. LA POINT, *Primary Examiner.*

F. W. MONAGHAN, *Assistant Examiner.*